United States Patent [19]

Toyohara

[11] Patent Number: 5,768,265
[45] Date of Patent: Jun. 16, 1998

[54] DUPLEX SIGNAL MULTIPLEXING SYSTEM

[75] Inventor: Takehiko Toyohara, Tokyo, Japan

[73] Assignee: NEC Corporation, Tokyo, Japan

[21] Appl. No.: 645,048

[22] Filed: May 10, 1996

Related U.S. Application Data

[63] Continuation of Ser. No. 258,493, Jun. 10, 1994, abandoned.

[30] Foreign Application Priority Data

Jun. 15, 1993 [JP] Japan ................. 5-143992

[51] Int. Cl.[6] ................. H04J 3/14; H04J 3/16
[52] U.S. Cl. ................. 370/282; 370/389; 370/468; 370/535; 340/825.07; 340/825.52
[58] Field of Search ................. 370/216, 217, 370/218, 219, 225, 228, 389, 392, 412, 535, 522, 537, 468, 276, 282; 340/825.07, 825.52

[56] References Cited

U.S. PATENT DOCUMENTS

4,160,128  7/1979  Texier ................. 370/58.1
4,933,934  6/1990  Aikoh et al. ................. 370/112

Primary Examiner—Wellington Chin
Assistant Examiner—Huy D. Vu
Attorney, Agent, or Firm—Foley & Lardner

[57] ABSTRACT

In a telecommunication system having an upper hierarchy device including duplicated transmit/receive circuits connected to lower hierarchy devices through time-division multiplex transmission lines, data to be transferred is divided into data blocks each having predetermined length. An information indicating validity of the transmitting data and an information specifying one of the duplicated transmit/receive circuits which transmits the data are given to fixedly allocated time slots as an identifier. The identifier and the data block having predetermined length are sent to an arbitrary time slot of a time-division multiplexing transmission line as one frame. In a receiving device, the data on the time-division multiplexing transmission line are taken in sequentially. Since it is possible to identify a sending transmit/receive circuit by monitoring only a specific time slot in which the identifier is located and controlling the system, an effective use of the transmission line is realized.

4 Claims, 9 Drawing Sheets

DUPLEX SIGNAL MULTIPLEXING SYSTEM

This application is a continuation of application Ser. No. 08/258,493, filed Jun. 10, 1994 now abandoned.

BACKGROUND OF THE INVENTION

1. Field of the Invention

The present invention relates to a data multiplexing system for use in telecommunication field and, particularly, to a multiplexing and a demultiplexing technology for a data transmission through a single transmission line between a lower hierarchy data transmission device (referred to as "lower hierarchy device", hereinafter) and an upper hierarchy data transmission device (referred to as "upper hierarchy device", hereinafter) which consists of duplicated transmit/receive circuits for the purpose of higher reliability.

The data multiplexing system according to the present invention is applicable to a data transmission between telecommunication nodes which are geographically separated from each other as well as to data transmission between devices which are included in a same node and are performing a distributed control.

2. Description of the Related Art

There have been three systems proposed as typical examples of multiplexing system of this kind, which will be described.

A first system among them is one in which one of duplicated transmit/receive circuits is selected and used as an active circuit and, when the active circuit becomes faulty, it is switched over to the remaining, standby circuit. In a second system, a set of data transfer time slots are assigned independently and uniformly to a single time-division multiplexed transmission line for each of duplicated transmit/receive circuits. The third system is one in which data are made into packets and multiplexed statistically.

These three systems will be described in detail with reference to FIGS. 1 to 6.

Figure 1:
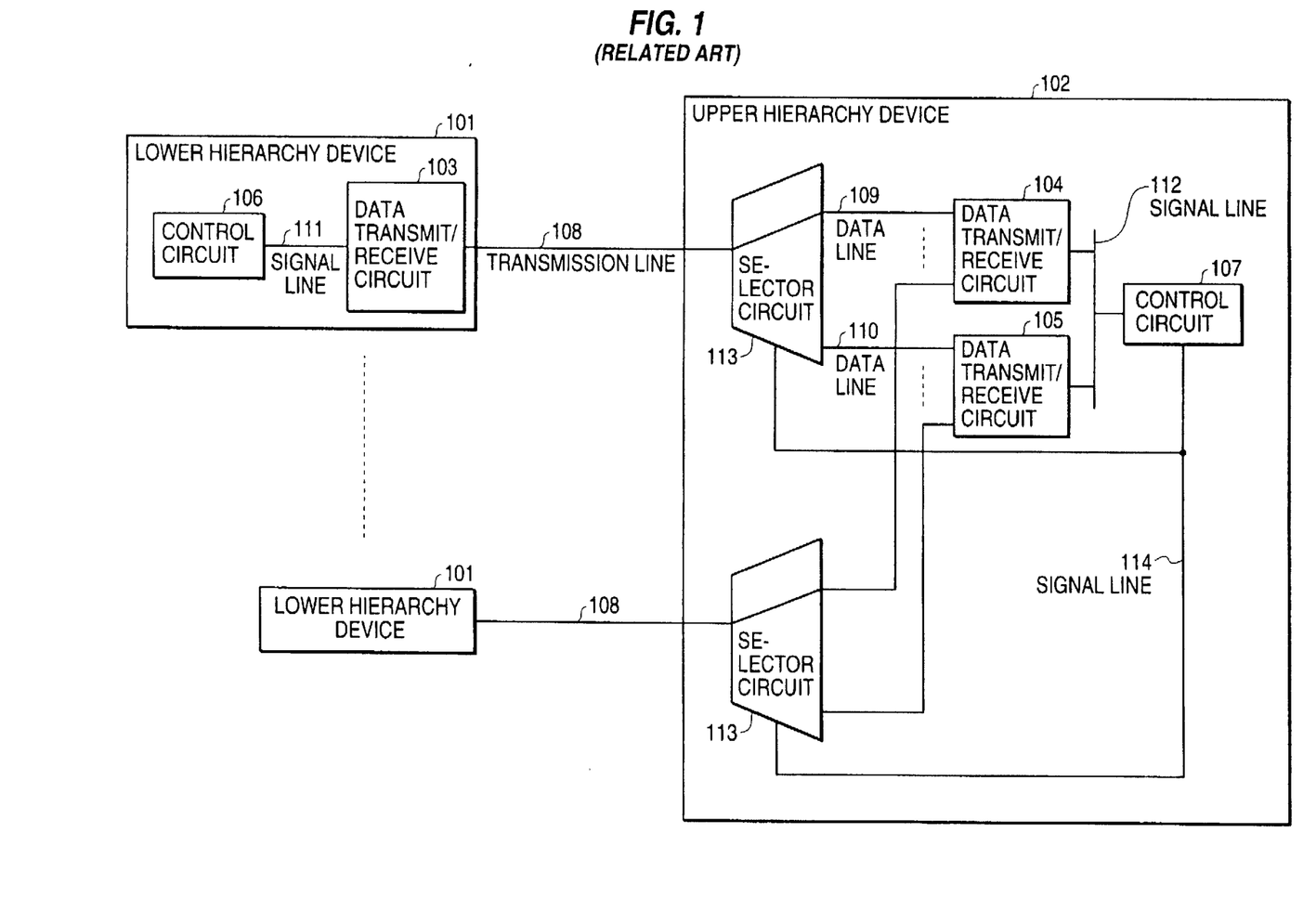
FIG. 1 is a block diagram of a first conventional system in which only a active circuit is selected and used.
Figure 2:
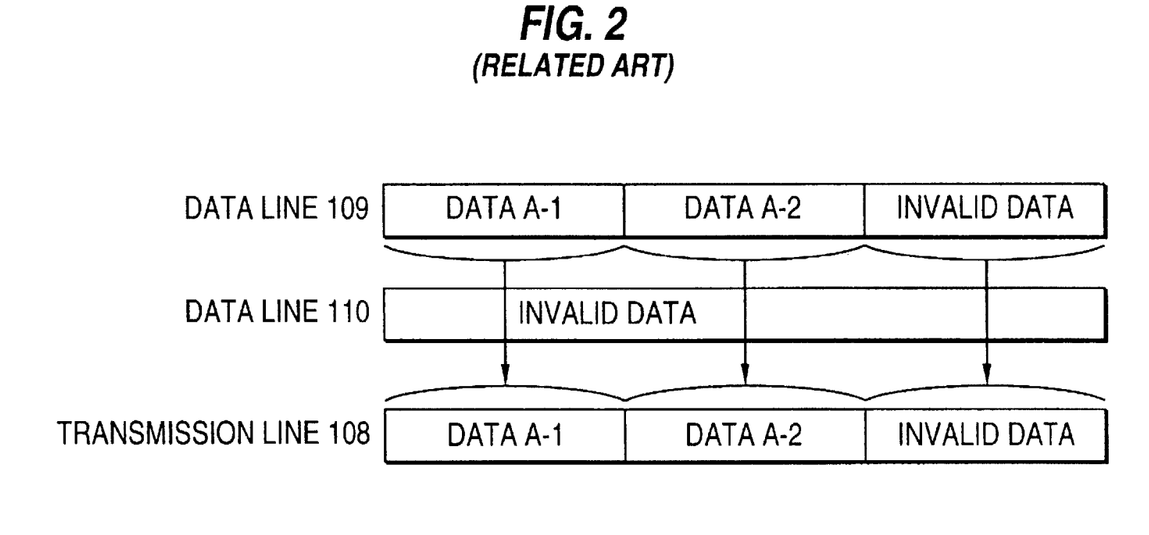
FIG. 2 is a time chart showing data flow in the first conventional system.

FIG. 1 is a block diagram showing an example of the first system and FIG. 2 is a corresponding time chart of data flowing through a data line and a transmission line.

In FIG. 1, an upper hierarchy device 102 is constituted with a control circuit 107, duplicated data transmit/receive circuits 104 and 105 and selector circuits 113, and a lower hierarchy device 101 is constituted with a control circuit 106 and a data transmit/receive circuit 103. The lower hierarchy device 101 and the upper hierarchy device 102 are connected to each other through a transmission line 108 to transmit/receive data therebetween.

In the first system, one of the duplicated data transmit/receive circuits 104 and 105 in the upper hierarchy device 102 is used as an active circuit and the other is used as a standby circuit.

The active data transmit/receive circuit transmits/receives data under control of a control signal supplied from the control circuit 107 through a signal line 112 and selector circuit 113 is connected to the duplicated data transmit/receive circuits 104 and 105 through data lines 109 and 110 and connects the active transmit/receive circuit 104 or 105 to the transmission line 108, in response to an active signal information which is used for selecting an active circuit and which is supplied from the control circuit 107 through the signal line 114.

In the lower hierarchy device 101, the data transmit/receive circuit 103 transmits/receives under control of the control circuit 106 through a signal line 111. Therefore, in this system, the lower hierarchy device is connected to only the active data transmit/receive circuit of the upper hierarchy device to transmit/receive data therebetween. FIG. 2 shows an example of data transfer from the upper hierarchy device 102 having the data transmit/receive circuit 104 as the active circuit to the lower hierarchy device 101, in which data related to only the data transmit/receive circuit 104 exist on the transmission line 108 and the data transmit/receive circuit 105 has no relation to data transfer in this case.

Figure 3:
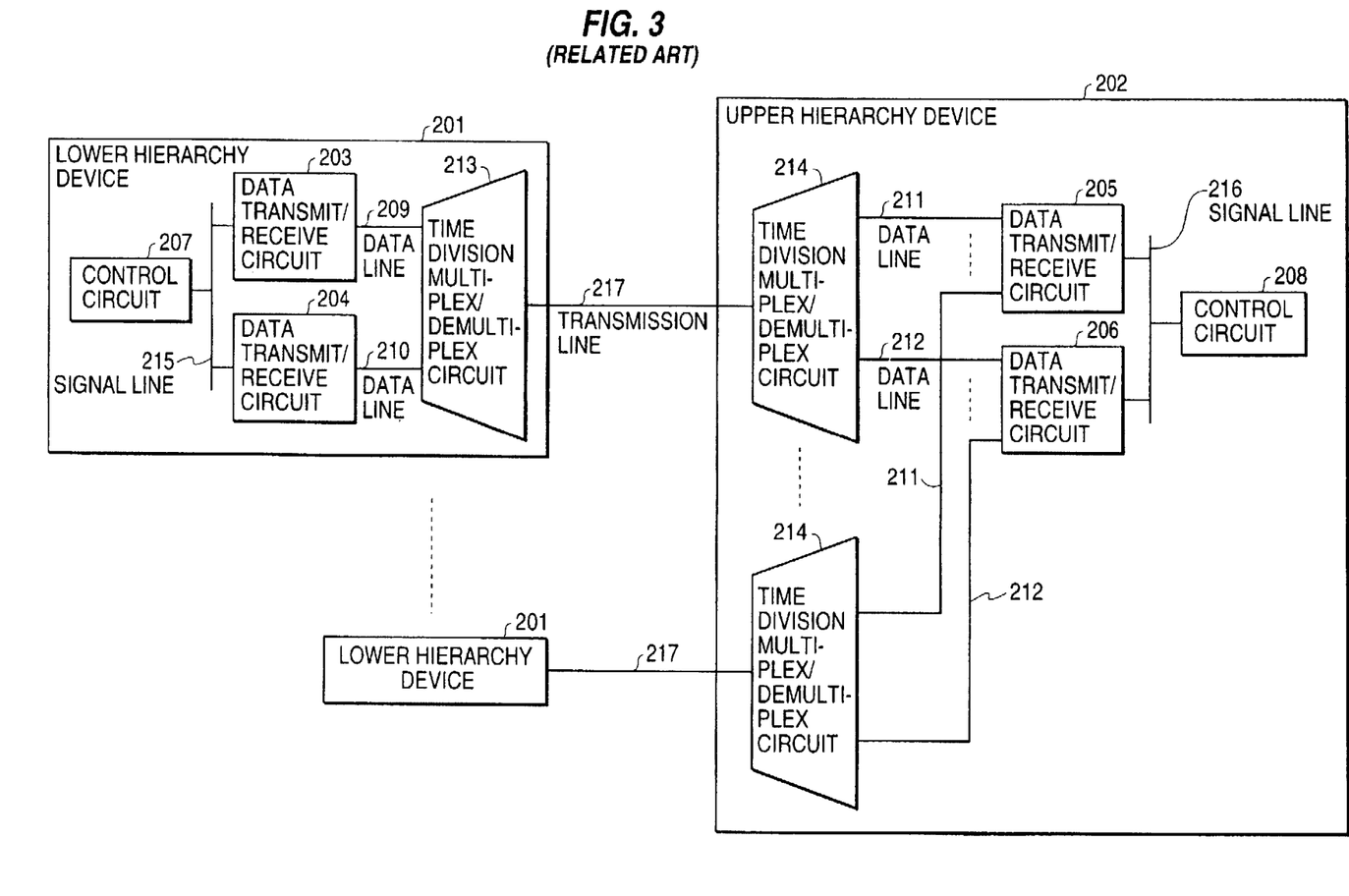
FIG. 3 is a block diagram of a second conventional system in which data of duplicated transmit/receive circuits are fixedly allocated on a single time-division multiplex transmission line.
Figure 4:
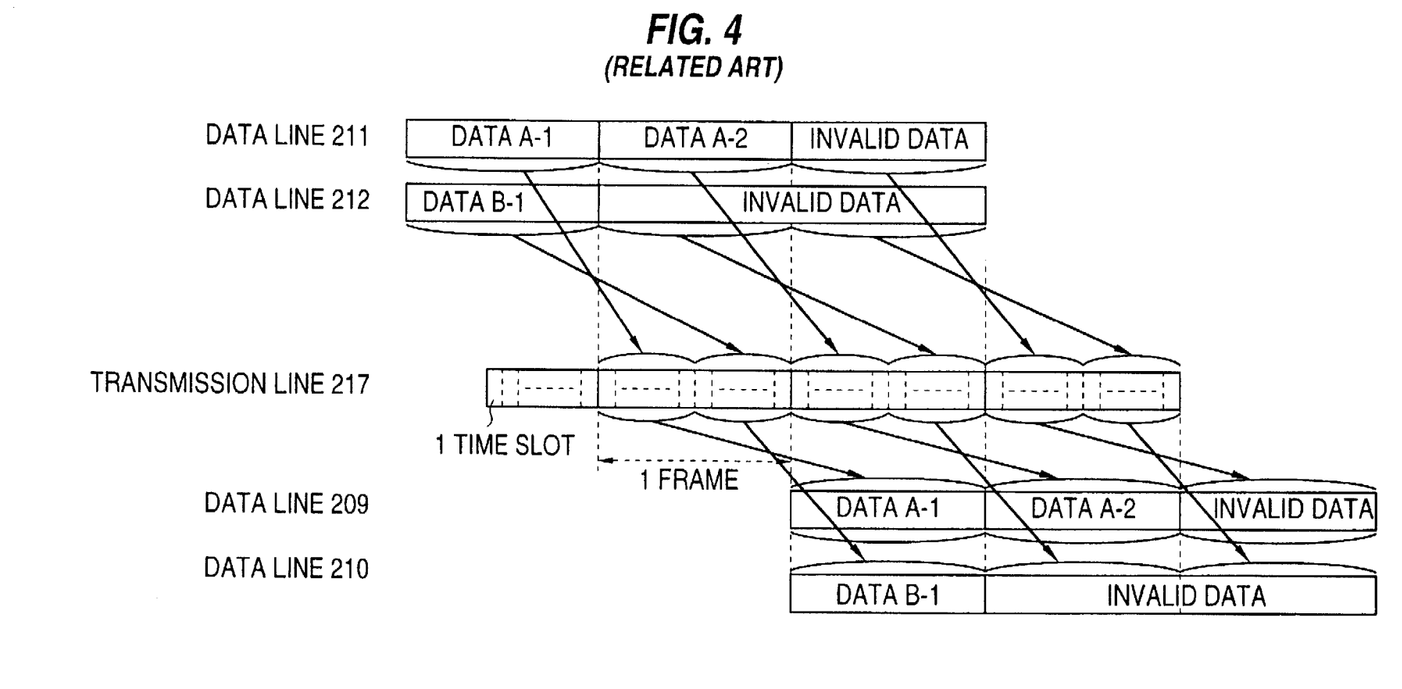
FIG. 4 is a time chart showing data flow in the second conventional system.

FIG. 3 is a block diagram showing an example of the second system and FIG. 4 is a corresponding time chart of data flowing through a data line and a transmission line.

Referring to FIG. 3, a lower hierarchy device 201 is constituted with a control circuit 207, duplicated data transmit/receive circuits 203 and 204 and a time-division multiplex/demultiplex circuit 213 and an upper hierarchy device 202 is constituted similarly. The lower hierarchy device 201 and the upper hierarchy device 202 are connected to each other through a transmission line 217 to transmit/receive data therebetween.

In the lower hierarchy device 201, the data transmit/receive circuits 203 and 204 transmits/receives data under control of the control circuit 207 through a signal line 215, and the time-division multiplex/demultiplex circuit 213 is connected to the duplicated data transmit/receive circuits 203 and 204 through data lines 209 and 210, respectively. The time-division multiplex/demultiplex circuit 213 multiplexes input data from the data transmit/receive circuits 203 and 204 and transmits them to the transmission line 217, and demultiplexes input data from the transmission line 217 and output them to the data lines 209 and 210. This is the same for the upper hierarchy device 202.

In this system, the physical transfer rates of data lines 211 and 212 are the same and that of the transmission line 217 is twice the transfer rate of the data line 211 or 212. On the transmission line 217, time slots are fixedly allocated to the respective data lines with a ratio 1:1. That is, as shown in FIG. 4, data of the upper hierarchy device 202 on the data line 211 and on the data line 212 are multiplexed in one frame and transmitted on the transmission line 217 and, in the lower hierarchy device 201, the multiplexed data are demultiplexed and distributed to the data lines 209 and 210.

Figure 5:
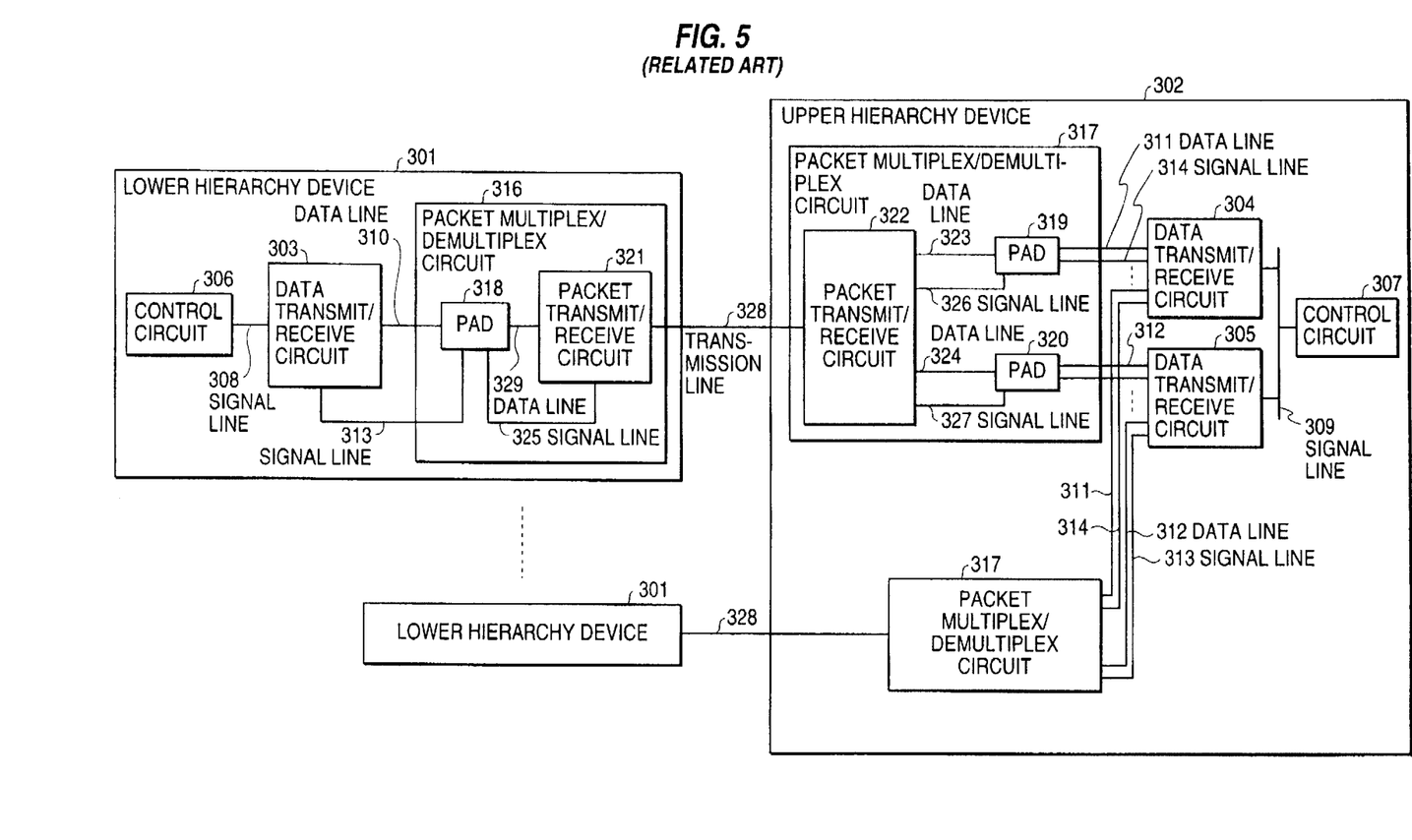
FIG. 5 is a block diagram of a third conventional system which utilizes a statistical multiplexing.
Figure 6:
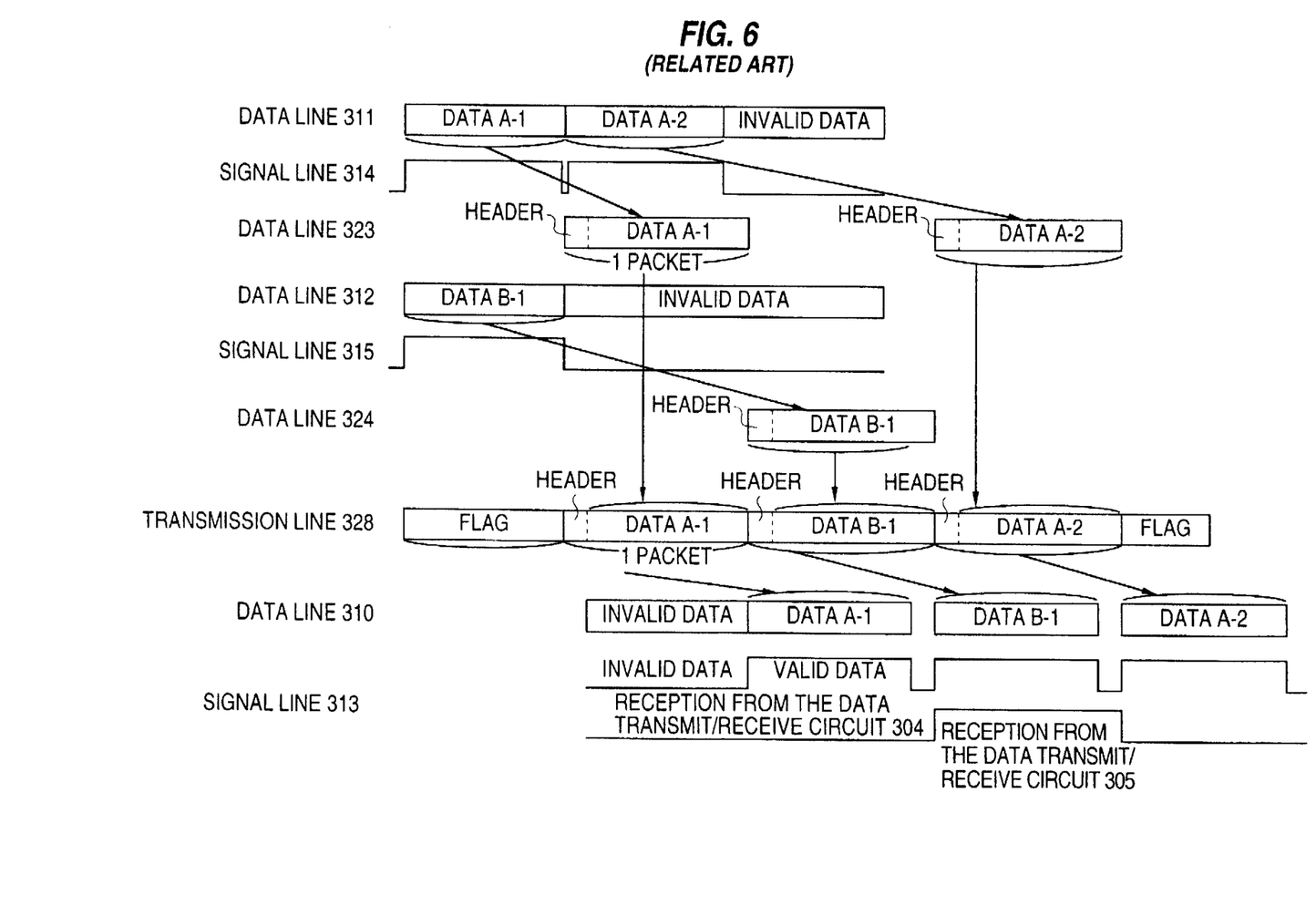
FIG. 6 is a time chart showing data flow in the third conventional system.

FIG. 5 is a block diagram showing an example of the third system, and FIG. 6 is a corresponding time chart of data and signals flowing through respective data lines, signal lines and a transmission line.

In FIG. 5, an upper hierarchy device 302 is constituted with a control circuit 307, duplicated data transmit/receive circuits 304 and 305 and packet multiplex/demultiplex circuits 317 each of which is constituted with PADs (packet Assembling Disassembling Circuits) 319 and 320 and a packet transmit/receive circuit 322, and a lower hierarchy device 301 is constituted with a control circuit 306, a data transmit/receive circuit 303 and a packet multiplex/demultiplex circuit 316 which is constituted with a PAD 318 and a packet transmit/receive cifcuit 321. The lower hierarchy device 301 is connected to the upper hierarchy device 302 through a transmission line 328 to transmit/receive data therebetween.

In the upper hierarchy device 302, the data transmit/receive circuits 304 and 305 transmit/receive data under control of the control circuit 307 through the signal line 309. The data transmit/receive circuit 304, the PAD 319 and the packet transmit/receive circuit 322 are connected to each other through the data lines 311 and 323 and the signal lines 314 and 326, respectively likewise, connection. And between the data transmit/receive circuit 305, the PAD 320 and the packet transmit/receive circuit 322 and between the data transmit/receive circuit 303, the PAD 318 and the packet transmit/receive circuit 321 are made similarly.

In the upper hierarchy device 302, when the PAD 319 is notified that the transmit/receive circuit 304 sends data through the data line 311 and effective data is being sent through the signal line 314, the PAD 319 adds thereto an originating address "0" indicating that the data is transmitted from the transmit/receive circuit 304, and further adds data length as a header and further stores the header until data is read out from the packet transmit/receive circuit 322. The same procedures are also taken in the transmit/receive circuit 305 and the PAD 320 except that "1" indicating that the transmit/receive circuit 305 is transmitting is added as the originating address.

The packet transmit/receive circuit 322 monitors the PADs 319 and 320 through the respective signal lines 326 and 327 and, when no data to be transmitted exists in both of the PAD 319 and 320, sends a specific flag pattern to synchronize its transmit/receive operation with the packet transmit/receive circuit 321 of the lower hierarchy device 301. When any data to be transmitted exist in either or both of the PADs 319 and 320, the packet transmit/receive circuit 322 stops sending the flag pattern and reads out data having a required data length sequentially from either of the PAD 319 or PAD 320 according to a predetermined priority through data lines 323 or 324 and sends it through a transmission line 328. In this case, the packet transmit/receive circuit 322 inserts 0 bit to the data as required in order to assure data transparency.

The packet transmit/receive circuit 321 of the lower hierarchy device 301, upon detection of a flag termination deletes the 0 bit, inserted by the packet transmit/receive circuit 322, from the data received thereafter and sends the data through a data line 329 to the PAD 318 and notifies PAD 318 through the signal line 325, that effective data is being transmitted. The PAD 318 analyses the originating address in the header to determine whether it is the data from the transmit/receive circuit 304 or 305 and notifies the result to the transmit/receive circuit 303 through the signal line 313. The PAD 318 further analyses the data length indicated in the header and sends the data, after removing the header, to the transmit/receive circuit 303 through the data line 310 and notifies the transmit/receive circuit 303 through the signal line 313 that effective data is being received.

When data is transmitted from the lower hierarchy device 301 to the upper hierarchy device 302, a similar operation to that mentioned above is performed. In such case, however, the transmit/receive circuit 303 of the lower hierarchy device 301 notifies the PAD 318 a destruction for the transmitted data to the transmit/receive circuit 304 or 305.

The PAD 318 adds a terminating address in a header according to the notified destination. The packet transmit/receive circuit 322 of the upper hierarchy device 302 which receives data from the lower hierarchy device 301 controls a distribution of the data to the transmit/receive circuit 304 or 305 according to the terminating address contained in the header.

The conventional systems described above have the following potential problems. That is, in the first conventional system, only the active circuit of the duplicated transmit/receive circuits is used usually and, therefore, it is impossible to confirm whether or not the standby circuit is usable normally and thus it is impossible to preliminarily assure normality of the standby circuit after it becomes the active circuit.

In the second conventional system, even in the case where an amount of communication of one of the duplicated transmit/receive circuits of the upper hierarchy device is smaller than that of the other, it is necessary to allocate the same number of time slots on the time division transmission line for both of the transmit/receive circuits by taking the switching between these circuits into consideration, which causes efficiency of utilization of the transmission line to be low. Further, it is necessary to duplicate transmit/receive circuits in the lower hierarchy device.

In the third conventional system, although utilization efficiency of the transmission line is high since effective data is selectively transmitted, the packet multiplex/ demultiplex circuits must perform the addition of a header, transmission/ reception of flag patterns, detection and analysis of header and insertion/deletion of the 0 bit for assurance of transparency, which causes the devices to be complicated.

SUMMARY OF THE INVENTION

The present invention was made in view of the above-mentioned state of art and has an object to provide a novel duplex signal multiplexing system which is capable of solving the potential problems of the conventional system.

In order to achieve the above object, in a telecommunication system for performing transmission and reception of intermittent data between an upper hierarchy device including duplicated transmit/receive circuits and a plurality of multiplex/demultiplex circuits and a plurality of lower hierarchy devices connected to each of the plurality of multiplex/demultiplex circuits of the upper hierarchy device through respective time-division transmission lines, a multiplexing system according to the present invention has a function, when there is effective data to be transmitted from the upper hierarchy device to the lower hierarchy device, of transmitting data in time slots commonly allocated to both of the duplicated transmit/receive circuits. The data is transmitted with an identifier, indicating that data to be received by the lower hierarchy devices is effective and specifying which is the data originating circuit among the duplicated transmit/receive circuits. The data is transmitted in a specific time slot fixedly allocated on the time division transmission lines. Further when there is effective data to be transmitted from the lower hierarchy device to the upper hierarchy device, data is transmitted in time slots commonly allocated to both of the duplicated transmit/receive circuits, after an identifier is sent indicating that data to be received by the upper hierarchy devices is effective and specifying which is the data terminating circuit among the duplicated transmit/ receive circuits. The data is transmitted in a specific time slot fixedly allocated on the time division transmission lines.

In this manner, data attached with the identifier flows through the time-division transmission line regardless of to which transmit/receive circuit and/or from which transmit/ receive circuit the data flows. The upper hierarchy device or the lower hierarchy device, which receives the data attached with the identifier, separates the data from the identifier and transfers it temporarily to a transmit/receive circuit and analyses the identifier to determine which of the transmit/ receive circuit to or from which the data flows and transfers a result of determination to the transmit/receive circuit in synchronism with the data transfer.

BRIEF DESCRIPTION OF THE DRAWINGS

The present invention will be described in further detail with reference to the accompanying drawings, in which.

DETAILED DESCRIPTION

A preferred embodiment of the present invention will be described in detail.

Figure 7:
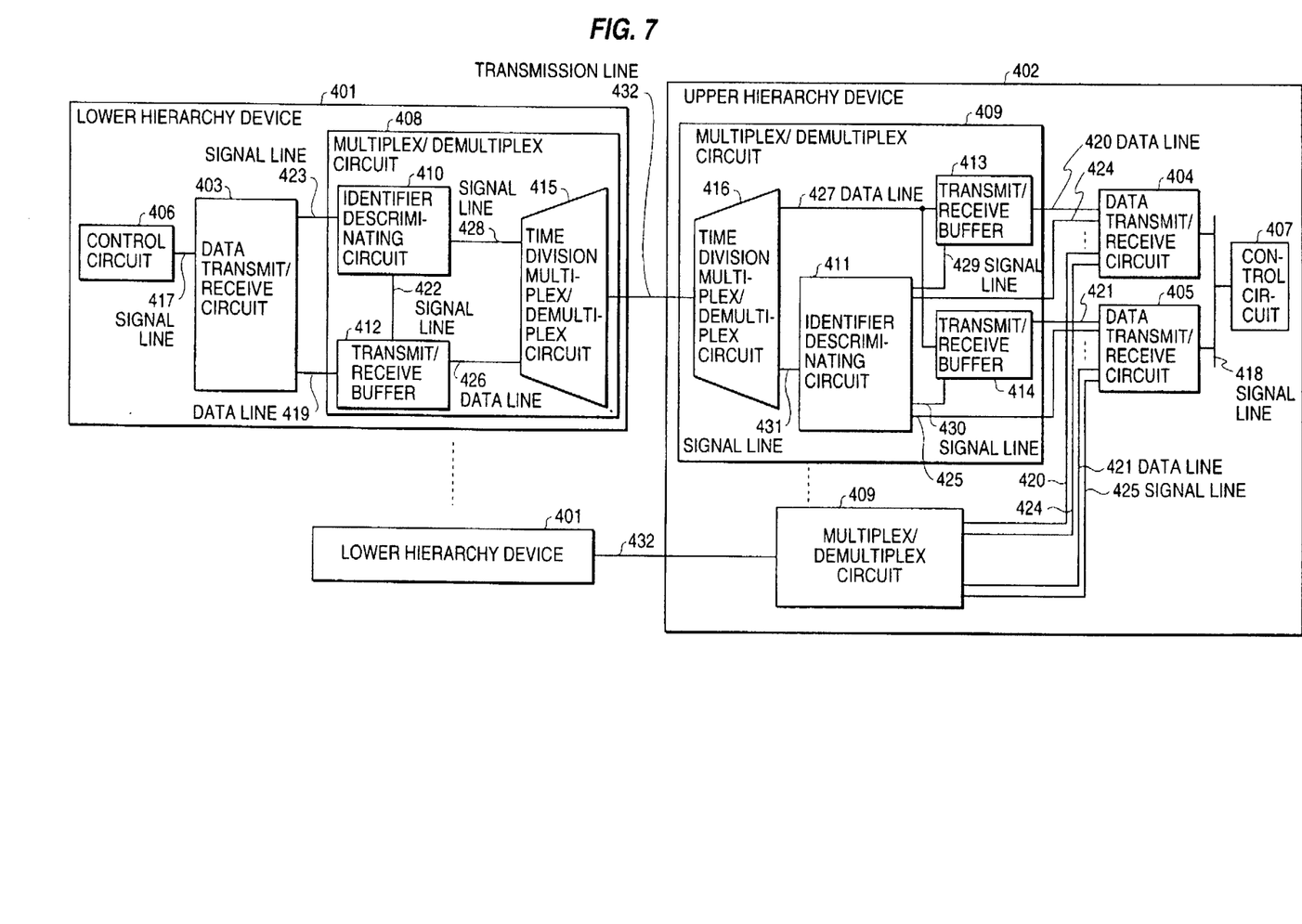
FIG. 7 is a block diagram showing a construction of an embodiment of the present invention.

Referring to FIG. 7, an upper hierarchy device 402 is constructed with a control circuit 407, transmit/receive circuit 404, as an active circuit, and transmit/receive circuit 405, as a standby circuit, and a multiplex/demultiplex circuit 409 which is in turn constructed with a transmit/receive buffer 413, a transmit/receive buffer 414, identifier discriminating circuit 411 and a time-division multiplex/demultiplex circuit 416. A plurality of lower hierarchy devices are provided. Each lower hierarchy device 401 is constructed with a control circuit 406, a data transmit/receive circuit 403 and a multiplex/demultiplex circuit 408 which is constructed with a transmit/receive buffer 412, an identifier discriminating circuit 410 and a time-division multiplex/ demultiplex circuit 415.

Figure 8:
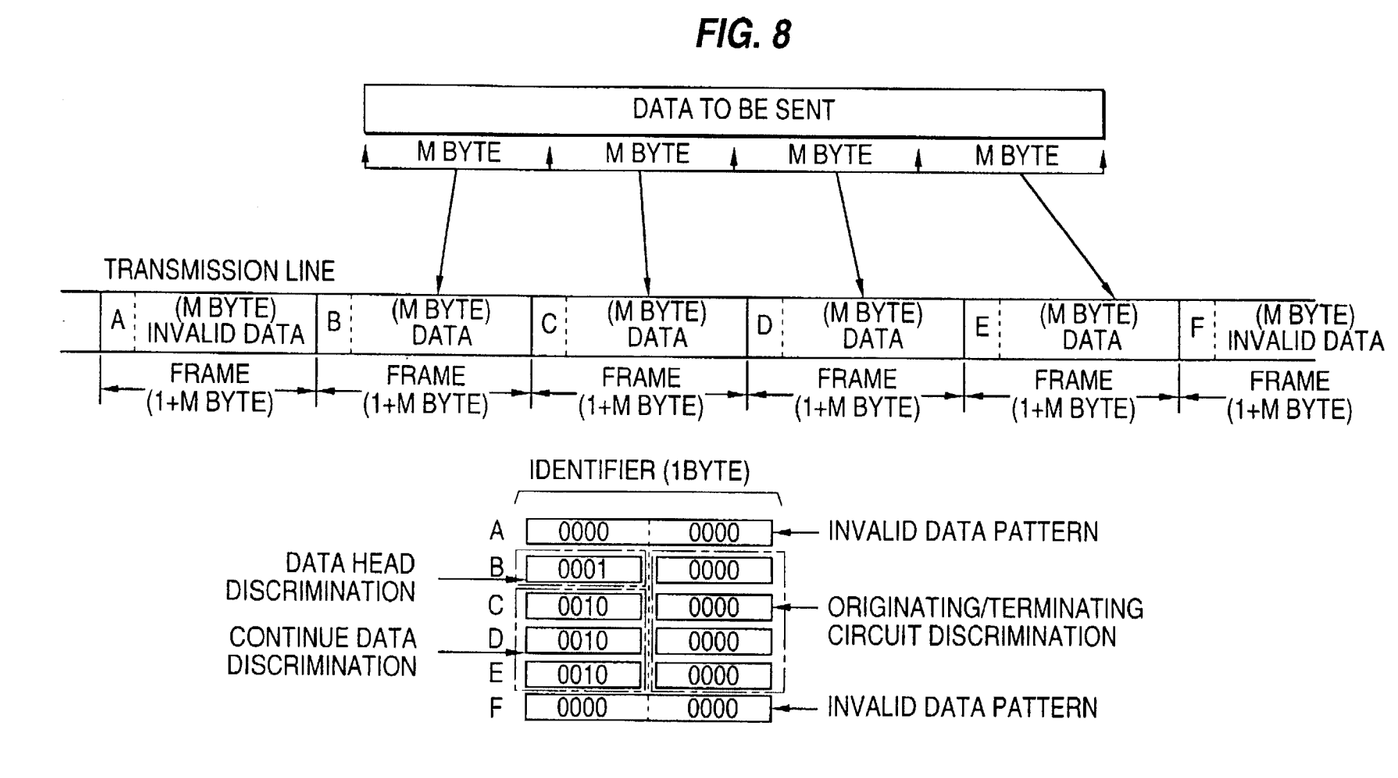
FIG. 8 shows a relationship between frame construction on a transmission line and data transmitted.

The lower hierarchy devices 401 are connected to the upper hierarchy device 402 through respective transmission lines 432 and data transmission/reception is performed intermittently therebetween. The data includes M bytes×N, where M bytes define a fixed length of unit data and N is a variable integer or a fixed integer. As shown in FIG. 8, the transmission line 432 has a frame construction of M+1time slots, including M time slots for M bytes of data and 1 identifier time slot.

In FIG. 8, data to be transmitted is divided into 4 data blocks each of M bytes. Each frame includes a data block of M bytes and each of 1 byte identifiers A, B, C, D or E is attached to the respective frames. But construction of the identifier will be described later.

In the upper hierarchy device 402, the data transmit/receive circuits 404 and 405 transmit/receive data under control of the control circuit 407 through a signal line 418. The data transmit/receive circuit 404, the identifier discriminating circuit 411, the transmit/receive buffer 413 and the time-division multiplex/demultiplex circuit 416 are connected to each other through data lines 420 and 427 and signal lines 424, 429 and 431, and the data transmit/receive circuit 405, the identifier discriminating circuit 411, the transmit/receive buffer 414 and the time-division multiplex/ demultiplex circuit 416 are also connected to each other similarly.

An operation of the system constructed as mentioned above will be described for a case where the upper hierarchy device 402 sends data.

In the upper hierarchy device 402, the data transmit/receive circuit 404 informs the identifier discriminating circuit 411 through a write signal line 424 that effective data is being sent to the transmit/receive buffer 413 through a data line 420 and further indicates an end of each data block of the data. The same is true for the data transmit/receive circuit 405 and the transmit/receive buffer 414. The identifier discriminating circuit 411 monitors the write state in the transmit/receive buffers 413 and 414 according to information given through the signal lines 424 and 425. A data invalid pattern "00000000" is sent to a signal line 431 as an identifier when no data to be transmitted exists in any of the transmit/receive buffers 413 and 414. When any data to be transmitted exists in either or both of the transmit/receive buffers 413 and 414, control of data transmission is commenced by the identifier discriminating circuit according to a predetermined priority.

When data in the transmit/receive buffer 413 is transmitted to the transmission line 432, the identifier discriminating circuit 411 first sends "00010000" as the identifier, where the upper 4 bits "0001" are the data header, and the lower 4 bits "0000" indicate data originating from the data transmit/receive circuit 404, to the time-division multiplex/demultiplex circuit 416 through the signal line 431. Then, the identifier discriminating circuit 411 sends a read out signal to the transmit/receive buffer 413 through the signal line 429 in order to transfer M bytes of data stored in the transmit/receive buffer 413 to the time-division multiplex/demultiplex circuit 416.

When the data length to be sent is not less than M bytes and the number of frames becomes is n (n is an integer more than 1) an indication of continuous data is added to the upper 4 bits of the identifier for the remaining frames. The upper 4 bits of the identifier for, the remaining (n−1) frames are set to "0010" to indicate that it is continuous data and "00100000" is sent to the time-division multiplex/demultiplex circuit 416 through the signal line 431 as an identifier, while M bytes of data read out sequentially from the transmit/receive buffer 413 are transferred to the time-division multiplex/ demultiplex circuit 416.

The above-describe operation is also true for a case of data read out from the transmit/receive buffer 414. In the latter case, however, the lower 4 bits of the identifier is set to "0001" indicating data from the data transmit/receive circuit 405.

The time-division multiplex/demultiplex circuit 416 multiplexes the identifier on the signal line 431 and the data on the data line 427 and sends the time-division multiplexed data to the transmission line 432.

Now, an operation of the lower hierarchy device 401 which receives data sent by the upper hierarchy device 402 in the manner as mentioned above will be described.

The time-division multiplex/demultiplex circuit 415 of the lower hierarchy device 401 distributes the received time slots to the identifier time slot and data time slots, and the identifier time slot is transferred to a signal line 428 and data time slots are transferred to the data line 426. The identifier discriminating circuit 410 periodically monitors the identifier received through the signal line 428 and, when it detects the upper 4 bits of "0001", recognizes a reception of effective data till reception of next "0001" or "0000". At the same time, the identifier discriminating circuit 410 also detects the lower 4 bits of the identifier and determines which one of the duplicated transmit/receive circuits of the upper hierarchy device sent the effective data. The received data transferred to the data line 426 is temporarily held in the transmit/receive buffer 412 and then transferred to the transmit/receive circuit 403 through the data line 419. The identifier discriminating circuit 410 transfers the result of discrimination of the identifier to the transmit/receive circuit 403 through the signal line 423 synchronized with its data transfer.

On the other hand, data transfer of the lower hierarchy device 401 to the upper hierarchy device 402 is performed as follow.

The data transmit/receive circuit 403 of the lower hierarchy device 401 sends data to the transmit/receive buffer 412 through the data line 419 and simultaneously informs the identifier discriminating circuit 410, through the write signal line 423, of the end of each data block and the fact that effective data is being sent to the buffer 412. The identifier discriminating circuit 410 responds to the information received through the signal line 423 to monitor a write state in the transmit/receive buffer 412 and, when there is no data in the transmit/receive buffer 412, it sends a data invalid pattern "00000000" to the signal line 428 as an identifier and, when there is data in the transmit/receive buffer 412, control of data transmission is commenced.

When data in the transmit/receive buffer 412 is sent to the transmit/receive circuit 404 of the upper hierarchy device 402 through the transmission line 432, the identifier discriminating circuit 410 sets "0001" in the upper 4 bits of the identifier, which indicates the data header and "0000" in the lower 4 bits, which indicates that the data is to be sent to the data transmit/receive circuit 404 and sends "00010000" to the time division multiplex/demultiplex circuit 415 through the signal line 428 as the identifier. Thereafter, it sends a read signal to the transmit/receive buffer 412 through the signal line 422 to effect the transfer of M-byte data to the time-division multiplex/demultiplex circuit 415 through the data line 426.

When the data to be transmitted is more than M bytes, the upper 4 bits of an identifier of each following frame of M bytes are set to "0010" which indicates that data in the following frame, is continuous to data in a preceeding frame The sequence "00100000" is transmitted as the identifier of each following frame, while data are read from the transmit/receive buffer 412 sequentially in units of M bytes and sent to the time-division multiplex/demultiplex circuit 415.

A transmission to the transmit/receive circuit 405 is performed similarly. In this case, however, "0001" which indicates data of the transmit/receive buffer 414 is set in the lower 4 bits of the identifier. The time-division multiplex/demultiplex circuit 415 multiplexes the identifier on the signal line 428 and the data on the data line 426 and sends the time-division multiplexed data to the transmission line 432.

The data thus sent from the lower hierarchy device 401 to the transmission line 432 is received by the upper hierarchy device 402.

An operation of the upper hierarchy device 402 in this case will be described.

The time-division multiplex/demultiplex circuit 416 of the upper hierarchy device 402 distributes each time slot of identifier and data received through the transmission line 432 to the signal line 431 and the data line 427, respectively. The identifier discriminating circuit 411, when detects "0001" as the upper 4 bits of the identifier, recognizes a reception of effective data till reception of a next identifier "0001" or "0000". At the same time, the identifier discriminating circuit 411 also detects the lower 4 bits to specify one of the duplicated transmit/receive circuits 404 and 405 of the upper hierarchy device 402 to which the information is directed.

The received data on the data line 427 is transferred to the data transmit/receive circuit 404 or 405 through the transmit/receive buffer 413 or 414 and data lines 420 or 421. The identifier discriminating circuit 411 transfers the result of discrimination to the data transmit/receive circuit 404 or 405 through the signal line 424 or 425 in synchronism with the data transfer.

Figure 9:
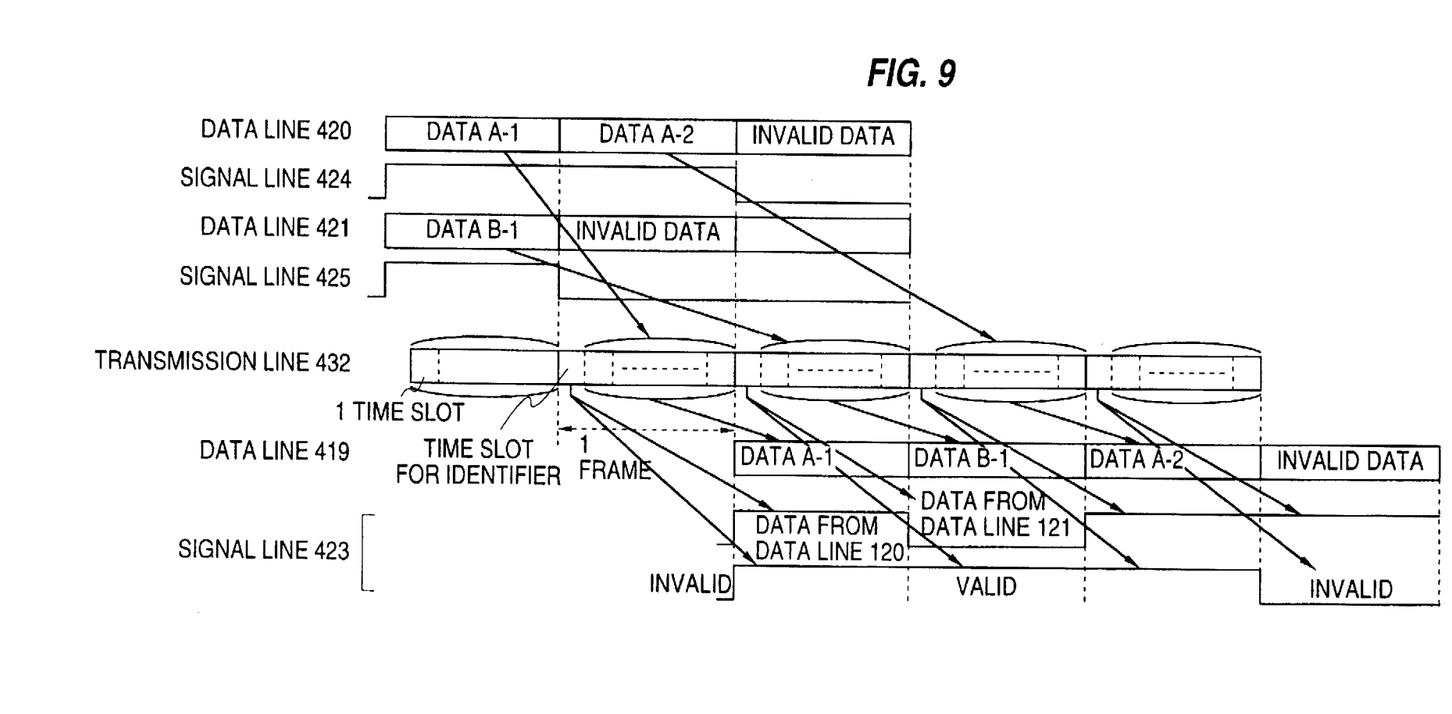
FIG. 9 is a time chart showing data and signal flows in the embodiment of the present invention.

FIG. 9 shows a time chart of the signals of the respective data lines, signal lines and transmission line during the data transfer from the upper hierarchy device 402 to the lower hierarchy device 401.

In order to assist a full understanding of the data transfer operation mentioned above, data and signal flows will be described in more detail with reference to FIG. 9.

In FIG. 9, an amount of data A-1 and A-2 flowing through the data line 420, which are sent from the transmit/receive circuit 404, corresponds to at most 2 data blocks each of M bytes. The signal on the write signal line 424 is used to inform the identifier discriminating circuit 411 of the fact that effective data is being sent from the transmit/receive circuit 404 and the end of each effective data block, in synchronism with the data on the data line 420.

Similarly, the signal on the data line 421 is data B-1 sent from the transmit/receive circuit 405 and the signal on the write signal line 425 informs the sending of data to the identifier discriminating circuit 411.

The data stored in the transmit/receive buffers 413 and 414 are attached with the identifiers as mentioned previously and sent sequentially to the transmission line 432 on the basis of the write signal received by the identifier discriminating circuit 411.

In FIG. 9, the data on the transmission line 432 flows in the order of data A-1, data B-1 and data A-2 and are received by the lower hierarchy device 401 in the same order.

The transmit/receive buffer 412 stores the data on the transmission line 432 sequentially.

On the other hand, the identifier discriminating circuit 410 analyses the identifier attached to the respective data to identify effectiveness of the data and specify one of the transmit/receive circuits 404 and 405 from which the data was sent.

Thereafter, the data to be sent to the data transmit/receive circuit 403 flows along the data line 419 in the same order as that stored in the transmit/received buffer 412. In FIG. 9, the data flows in the order of data A-1, data B-1 and data A-2.

Simultaneously, on the signal line 423, the signal indicating the validity of data and originating transmit/receive circuit which sent the data flows in synchronism with the data on the data line 419.

As described hereinbefore, in a telecommunication system for intermittently performing transmission and reception of data between an upper hierarchy device including duplicated transmit/receive circuits and a plurality of multiplex/demultiplex circuits and a plurality of lower hierarchy devices connected to each of the plurality of multiplex/demultiplex circuits of the upper hierarchy device through respective timedivision transmission lines, a multiplexing system according to the present invention has a function, when there is effective data to be transmitted from the upper hierarchy device to the lower hierarchy device, of transmitting data in time slots commonly allocated to the both of the duplicated transmit/receive circuits after having sent an identifier indicating that data to be received by the lower hierarchy devices is effective and specifying which is the data originating circuit among the duplicated transmit/receive circuits in a specific time slot fixedly allocated on the time division transmission lines. Further, when there is effective data to be transmitted from the lower hierarchy device to the upper hierarchy device, data is transmitted in time slots commonly allocated to both of the duplicated transmit/receive circuits after an identifier is sent indicating that data to be received by the upper hierarchy devices is effective and specifying which is the data terminating circuit among the duplicated transmit/receive circuits in a specific time slot allocated fixedly on the time division transmission lines. Since, therefore, in accordance with the invention it is sufficient to monitor specific time slots, it is possible to perform, with a simple circuit construction, a communication through two channels of the duplicated transmit/receive circuits of the upper hierarchy device and, since data is sent after confirmation of validity thereof, it is possible to use the transmission line effectively.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A duplexed signal multiplexing system for transmitting and receiving data through a transmission line between an upper hierarchy device and a lower hierarchy device comprising:

said upper hierarchy device which comprises
   at least two first transmit/receive devices, each operable for transmitting/receiving data having a variable length;
   at least two first transmit/receive buffering devices each connected to a corresponding one of said first transmit/receive devices respectively, storing data from the corresponding first transmit/receive device;
   a first identifier discriminating device connected to said first transmit/receive devices and to said first transmit/receive buffering devices, dividing data stored in said first transmit/receive buffering devices into data blocks each having a predetermined number of time slots to form a frame for outputting in accordance with information provided by the corresponding first transmit/receive device, outputting an identifier corresponding to each data block, said identifier indicating an origin of data from among said at least two first transmit/receive devices and a continuity state of a succeeding data block; and
   a first time division multiplex/demultiplexer connected to said first transmit/receive buffering devices and to said first identifier discriminating device, multiplexing data blocks output from each of said first transmit/receive buffering devices with identifiers provided from said first identifier discriminating device and outputting said multiplexed data blocks each having an identifier to said transmission line;

said lower hierarchy device which comprises
   a second transmit/receive device for selectively receiving said data transmitted from said first transmit/receive devices in said upper hierarchy device;
   a second time division multiplex/demultiplexer connected to said transmission line from said upper hierarchy device, demultiplexing said data and corresponding identifiers transmitted on said transmission line, outputting demultiplexed frames and corresponding identifiers respectively;
   a second transmit/receive buffering device connected to said second time division multiplex/demultiplexer and to said second transmit/receive device, storing frames output from said second time division multiplex/demultiplexer; and
   a second identifier discriminating device connected to said second time division multiplex/demultiplexer, to said second transmit/receive buffering device and to said second transmit/receive device, discriminating each identifier output from said second time division multiplex/demultiplexer, reading out a data block corresponding to a frame from said second transmit/receive buffering device for transmitting to said second transmit/receive device together with the corresponding identifier indicating an origin of data and continuity state of data; and
   said transmission line transmitting said frames for said divided data blocks and each frame being commonly available to each of said first transmit/receive devices.

2. A duplexed signal multiplexing system for transmitting and receiving data through a transmission line between an upper hierarchy device and a lower hierarchy device comprising:

said lower hierarchy device which comprises
   a first transmit/receive device for transmitting/receiving data having a variable length;
   a first transmit/receive buffering device connected to said first transmit/receive device, storing data output from said first transmit/receive device;
   a first identifier discriminating device connected to said first transmit/receive buffering device and to said first transmit/receive device, dividing data stored in said first transmit/receive buffering device into data blocks each having a predetermined number of time slots to form a frame for outputting in accordance with information provided by said first transmit/receive device, outputting an identifier corresponding to each data block, said identifier indicating a destination of data to be transmitted and a continuity state of a succeeding data block; and
   a first time division multiplex/demultiplexer connected to said first transmit/receive buffering device and to said first identifier discriminating device, multiplexing data blocks output from said first transmit/receive buffering device with identifiers provided from said first identifier discriminating device, and outputting said multiplexed data blocks each having an identifier to said transmission line;

said upper hierarchy device which comprises
   at least two second transmit/receive devices for selectively receiving said data transmitted from said first transmit/receive device in said lower hierarchy device;
   a second time division multiplex/demultiplexer connected to said transmission line from said lower hierarchy device, demultiplexing said data and corresponding identifiers transmitted on said transmission line, outputting demultiplexed frames and corresponding identifiers respectively;
   at least two second transmit/receive buffering devices connected to said second time division multiplex/demultiplexer and to one of said second transmit/receive devices each, storing frames output from said second time division multiplex/demultiplexer; and
   a second identifier discriminating device connected to said second time division multiplex/demultiplexer, to said second transmit/receive buffering devices and to said second transmit/receive devices, discriminating each identifier output from said second time division multiplex/demultiplexer, reading out a data block in each frame from said second transmit/receive buffering devices for transmitting to the corresponding second transmit/receive device in accordance with a destination indicated in said identifier together with corresponding identifier indicating continuity state of data; and said transmission line transmitting said frames for said divided data blocks and each frame being commonly available to each of said second transmit/receive devices.

3. A duplexed signal multiplexing system as recited in claim 1, wherein said first identifier discriminating device further outputs an identifier indicating that no data block is available to be transmitted, and said transmission line further transmitting frames having said identifier indicating no data block contained.

4. A duplexed signal multiplexing system as recited in claim 2, wherein said first identifier discriminating device further outputs an identifier indicating no data block is available to be transmitted, and said transmission line further transmitting frames having said identifier indicating no data block contained.

* * * * *